United States Patent [19]
Ward

[11] Patent Number: 5,305,253
[45] Date of Patent: Apr. 19, 1994

[54] ZERO FALL-THROUGH TIME ASYNCHRONOUS FIFO BUFFER WITH NONAMBIGUOUS EMPTY-FULL RESOLUTION

[75] Inventor: Morris D. Ward, Garland, Tex.

[73] Assignee: Texas Instruments Incorporated, Dallas, Tex.

[21] Appl. No.: 75,846

[22] Filed: Jun. 11, 1993

Related U.S. Application Data

[63] Continuation of Ser. No. 746,920, Jun. 20, 1985, abandoned.

[51] Int. Cl.⁵ .................... G11C 7/00; G11C 19/00
[52] U.S. Cl. .......................... 365/73; 365/78; 365/189.01; 365/189.05; 365/189.07; 365/230.08
[58] Field of Search .............. 365/73, 78, 189.01, 365/189.03, 189.07, 221, 230.08

[56] References Cited

U.S. PATENT DOCUMENTS

| | | | |
|---|---|---|---|
| 2,907,004 | 9/1959 | Chien et al. | 360/51 |
| 3,896,417 | 7/1975 | Beecham | 365/221 X |
| 4,084,154 | 4/1978 | Panigrahi | 365/78 X |
| 4,151,609 | 4/1979 | Moss | 365/221 |
| 4,156,288 | 5/1979 | Spandorfer | 365/78 |
| 4,222,102 | 9/1980 | Jansen et al. | 365/221 X |
| 4,459,681 | 7/1984 | Ohtsuka | 365/221 X |
| 4,592,019 | 5/1986 | Huang et al. | 365/189 X |
| 4,599,708 | 7/1986 | Schuster | 365/189 |
| 4,694,426 | 9/1987 | Mason | 365/78 |

Primary Examiner—Joseph L. Dixon
Attorney, Agent, or Firm—Robby T. Holland; Rene E. Grossman; Richard Donaldson

[57] ABSTRACT

A First In First Out shift register memory system (10) with a plurality of memory word registers (50) having data inputs connected to a common data-in bus (16), and a plurality of data outputs connected to a common data-out bus (22). A read address ring counter (36) and write address ring counter (32) are responsive to respective read and write pulses to sequentially perform memory read and write operations. A comparator (40) compares the address outputs of the ring counters (36, 32) for equality. A read and a write signal generator (80, 60) are provided for producing respective read and write pulses in response to input transitions of read and write commands. A last operation R/W flip-flop (70) maintains an account of the last read and write memory operation processed by the system. Read and write enable latches (90, 66) are responsive to the comparator (40) output indication of address equality, and responsive to the last operation R/W flip-flop (70) output indication of the last memory operation to prevent the reading of the memory (48) by read pulses when empty, and the writing of the memory (48) by write pulses when full.

22 Claims, 3 Drawing Sheets

ZERO FALL-THROUGH TIME ASYNCHRONOUS FIFO BUFFER WITH NONAMBIGUOUS EMPTY-FULL RESOLUTION

This application is a continuation of application Ser. No. 06/746,920, filed Jun. 20, 1985 now abandoned.

TECHNICAL FIELD OF THE INVENTION

The present invention relates in general to the asynchronous transmission of digital signals, and more particularly relates to a memory buffer in which the asynchronous writing and reading of digital information is carefully controlled by the empty and full status of the memory.

BACKGROUND OF THE INVENTION

The wide acceptance and current popularity of data transmission is evidenced by the amount of commercially available digital peripheral equipment which is connectable to computer processors, or the like. By and large, data processing systems required intercommunication between extremely fast operating peripheral equipment such as disk storage systems and printers.

The most efficient use of such a system is realized when the various interconnected components of the system can communicate asynchronously, whereby the fast operating equipment need not communicate with, for example, a printer, at the printer's slower communication rate.

It is a well-known practice to employ memories as intermediate buffers between the components of a system for storing data written therein by the transmitting equipment at one speed, and read therefrom by destination equipment at another speed. With this arrangement, it is imperative that memory storage space is available when the transmitting equipment transmits data. Moreover, when the memory storage space is full, it is necessary that the transmitting equipment is signaled so that further transmission cannot be accomplished. It is equally important that the destination equipment be signaled by the intermediate buffer when the memory storage is empty so that further reading thereof cannot be accomplished until additional data has been written therein by the transmitting equipment.

It is not uncommon, therefore, to find memory structures for buffering asynchronous communications between digital machines. It is well-known that shift registers may be employed for serially writing digital words therein at a desired speed, and read serially therefrom at a different speed. The problem with this type of buffer, however, is that the data written therein must be rippled through every memory location until the data is available at the output end. With this technique, a substantial delay in time must be experienced in progressively shifting the data from the input of the shift register to its output.

More recently, buffer random access memories have been developed which take on a First In First Out (FIFO) characteristic. However, the movement of the data within such a memory is managed by a control section which maintains an account of which storage cells hold effective data. See, for example, U.S. Pat. Nos. 4,151,6608 and 4,459,681. These FIFO memory devices yet require the data to be shifted from cell to cell, and thus have inherently long through-put or fall-through times.

A further improvement in memory buffers is disclosed at Page 181 in the June, 1983 issue of *Computer Design*, wherein there is disclosed an input data bus to each storage location, and an output data bus onto which the data stored in any of the word locations can be read. With this system, however, memory write cycles are initiated on one edge of a write pulse, but data is actually written into the memory on the other transition thereof. The reliability of data written into the memory with this technique is generally good; however, data which is changing near the write pulse transition is unreliable. Moreover, the FIFO memory requires a running account of the particular addresses currently being written and read to determine the empty or full status of the buffer. Because various events may occur, both externally and internally within the FIFO memory, between the rising and falling transition of the write pulses, the true empty or full status frequently becomes uncertain. Therefore, the empty or full status cannot be absolutely guaranteed.

There is therefore a need for a FIFO memory buffer which has very nearly a zero through-put time, i.e., a zero fall-through time, and in which the empty or full status thereof can be determined with absolute certainty.

There is also a need for a FIFO type of memory buffer wherein all internal operations are commenced and carried through as a result of a single transition of a read or write signal.

A concomitant need exists for an extremely fast FIFO memory buffer wherein different memory words can be read and written simultaneously, or where the same word can be written and read within an extremely short period of time.

BRIEF DESCRIPTION OF THE DRAWINGS

Further objects and features of the present invention will become apparent from the description of an illustrative embodiment thereof, taken in conjunction with the accompanying drawings, in which.

SUMMARY OF THE INVENTION

In accordance with the present invention, a FIFO memory buffer is provided which substantially eliminates and reduces the problems associated with the prior art devices.

In accordance with the invention, there is provided a plurality of memory word locations having a common data-in bus for writing data directly into the memory locations, and a common data-out bus from which memory locations can be directly read. A write address ring counter sequentially addresses each memory word location in response to input write commands. A read address ring counter operates similarly to sequentially read memory word locations in response to input read commands. A W/R controller is responsive to the leading edge transition of an input write command to latch input data on the input data bus. The W/R controller is also responsive to the leading edge of write and read commands to increment the respective write or read ring address ring counters and to conduct the actual writing or reading of the addressed memory word. In addition, the W/R controller maintains an account of whether the last memory operation was a write operation or a read operation.

A comparator is provided for comparing the current address of the write address ring counter with that of the read address ring counter. When there is equality between the counters, and if the last memory operation was a read operation, the next read operation will be inhibited, as the FIFO memory is empty. On the other hand, if the write and read address ring counters point to the same memory location (address equality), and the last operation was a write operation, a further write operation without an intervening read will be inhibited, as the FIFO memory is full.

DETAILED DESCRIPTION OF THE INVENTION

Figure 1:
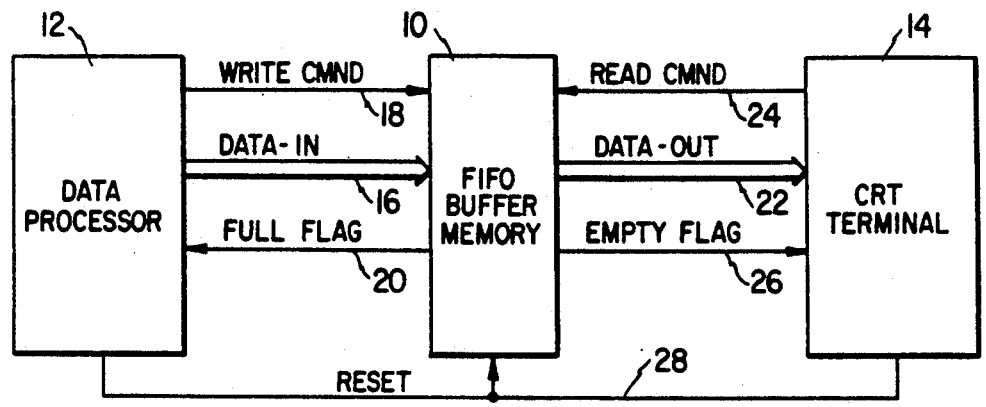
FIG. 1 is a block diagram of an environment in which the present invention may be practiced.

While the present invention may find a wide variety of applications in digital communications, FIG. 1 is exemplary of an environment in which the invention may be advantageously practiced. The FIFO memory buffer, generally designated by reference character 10, is shown situated between a high speed data processor 12 in communication through the FIFO memory buffer 10 to a low speed Cathode Ray Tube (CRT) terminal 14. The data communications is in the direction from the data processor 12 to the CRT terminal 14, and in the example the data processor 12 is capable of writing data into the FIFO memory buffer 10 at a rate much higher than can be read by the CRT terminal 14. Data processors are capable of transmission rates in the neighborhood of 9600 bits per second, while typical peripheral components, such as the CRT terminal 14, may be capable of transmission rates of only 1200 bits per second.

The FIFO memory buffer 10, therefore, provides an intermediate data storage means wherein data may be written at a first rate, and read therefrom at a different rate. It should be understood, however, that the FIFO memory buffer 10 of the present invention may be utilized with equal effectiveness when the data write speed is slower than the data read speed. In those cases where data transmissions into the FIFO memory buffer 10, i.e., data write operations, are at rates higher than the data read operations, the primary concern is with the detection of a completely filled memory and the alerting of the data processor 12 of the same such that data transmissions can be interrupted. On the other hand, when the rate of data read operations exceeds that of the write operations the concern is with the detection of an empty FIFO memory buffer 10. In this event the CRT terminal 14 must be alerted of such status in sufficient time such that a further read command by the CRT terminal 14 does not cause the meaningless read operation of an empty FIFO memory buffer.

In practical digital data transmissions, however, both empty and full memory buffer situations may occur as short bursts of high speed data write operations may fill the buffer memory, while longer bursts of low speed data read operations may deplete the memory buffer. Therefore, irrespective of whether the originating equipment or the destination equipment is the respective high speed or low speed equipment, the FIFO memory buffer 10 can experience both empty and full statuses.

With reference again to the exemplary system of FIG. 1, since data flow is in the direction from the data processor 12 to the CRT terminal 14, a data-in bus 16 provides a transmission medium from the data processor 12 to the FIFO memory buffer 10. Accompanying the data-in bus 16 is a write command line 18 on which write commands accompany each word of data transmitted on the data-in bus 16. A full flag line 20 is provided from the FIFO memory buffer 10 to the data processor 12 for signaling the latter that the memory buffer is full. The details of this flag will be dealt with more fully below.

In completing the overall transmission path from the data processor 12 to the CRT terminal 14, a data-out bus 22 is provided from the FIFO memory buffer 10 to the CRT terminal 14. Digital data is transferred from the FIFO memory buffer 10 to the CRT terminal 14 by read commands issued by the CRT terminal 14 to the FIFO memory buffer 10 on a read command line 24. Thus, data will be read from the FIFO memory buffer 10 and output on the data-out bus 22 at the rate at which read commands appear on the read command line 24.

The empty status of the FIFO memory buffer 10 is signaled to the CRT terminal 14 via empty flag line 26. A reset line 28 is directed to the FIFO memory buffer 10 from the data processor 12 and the CRT terminal 14 for initializing the memory buffer to desired initial states.

Figure 2:
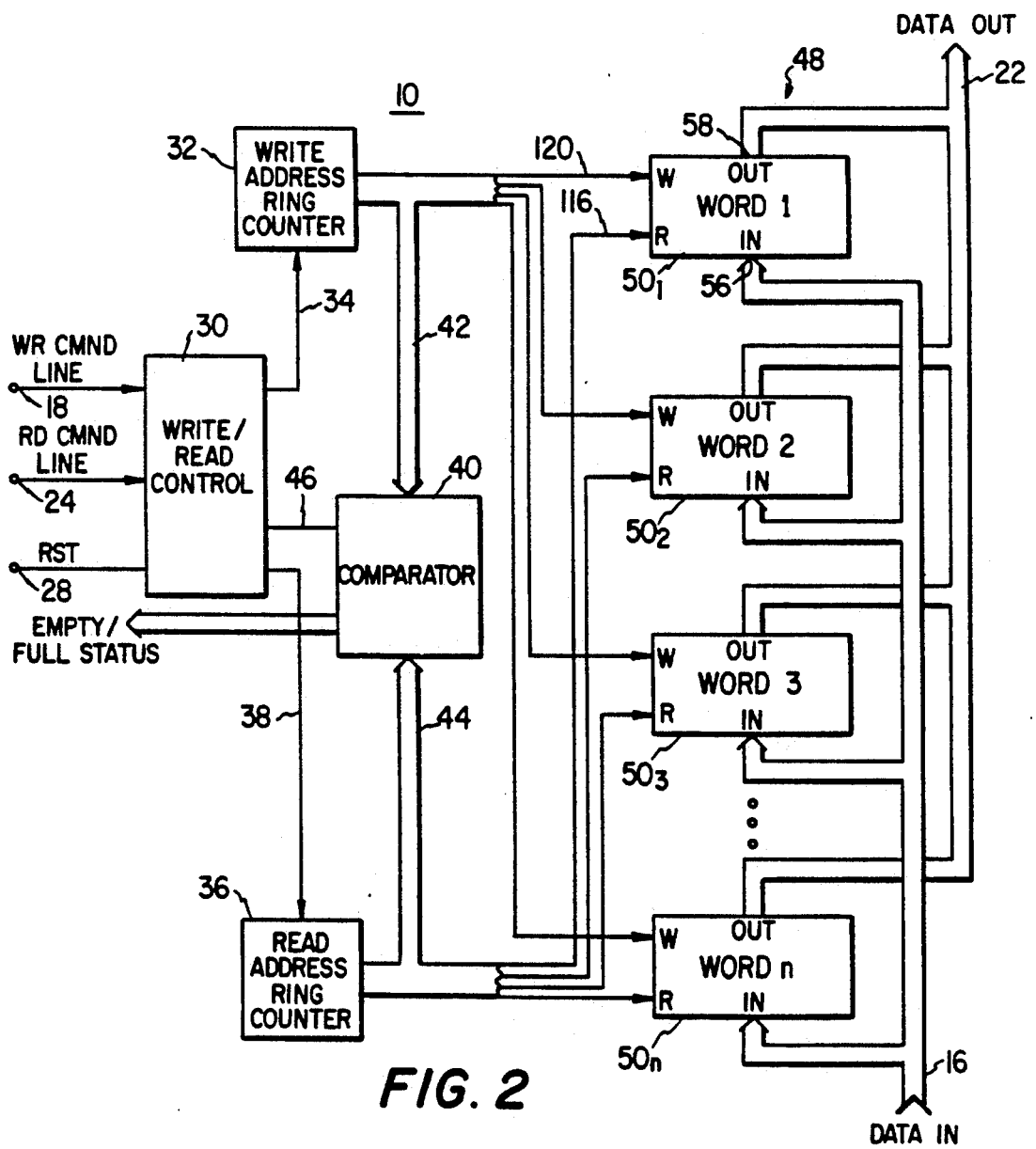
FIG. 2 is a more detailed block diagram of the invention illustrating the various functional sections of the FIFO memory buffer.

With reference to FIG. 2 of the drawings, there is illustrated the basic structural features of the FIFO memory buffer 10 according to the invention.

A write/read (W/R) controller 30 receives write and read commands respectively from the data processor 12 and CRT terminal 14 for controlling the writing and reading of a memory 48. The W/R controller 30 directs corresponding write and read signals to a multistage write address ring counter 32 on write line 34, and to a multistage read address ring counter 36 on read line 38. Importantly, and to be discussed in more detail below, the W/R controller 30 maintains an account of whether the last memory operation command processed was a write command or a read command.

A comparator 40, comprising a plurality of logic gates, is connected to the write address ring counter 32 and the read address ring counter 36 by a respective plurality of conductors 42 and 44. The comparator 40 is also connected to the W/R controller 30 by a line 46 for signaling when the write and read address ring counters 32 and 36 point to the same address. With this information, and to be discussed in more detail below, the W/R controller 30 can determine when the memory 48 is full or empty.

The memory 48 is provided with a plurality of memory word locations or registers $50_{1-N}$ which store words $1-N$. Each memory word registers $50_N$ is uniquely connected to a stage of the write address ring counter 32 to effect memory write operations of such memory register. Each memory word register is further connected to an associated stage of the read address ring counter 36 for accomplishing memory read operations. Hereinafter, a memory word location addressed during a write or a read operation is referred to as being pointed to by one of the ring counters 32 or 36. A full understanding of the invention will be realized when it is understood that when the read address ring counter 36 points to the same memory word register 1−N as does the write address ring counter 32, and the last memory operation was a write operation, the memory 48 is full. Similarly, when the write and read address ring counters 32 and 36 point to the same memory word register 1−N, and the last command received was a read command, the receipt of another read command will not be processed as the memory 48 is empty.

For example, assume that memory register $50_2$ of the memory 48 in FIG. 2 has been read and thus the read address counter 36 points to register $50_2$. Memory word registers $50_2$ through $50_N$, as well as $50_1$, can then be written with new data. When memory word register $50_1$, is written, the memory 48 is full. Moreover, the read address ring counter 36 and write address ring counter point to register $50_2$ and the last memory operation was a write operation.

Conversely, if the entire memory 48 has been written, and thus memory register $50_N$ has been written, the write address ring counter 32 will point to register $50_1$. In this situation registers $50_1$ through $50_N$, may be subsequently read wherein the memory 48 will be empty. It is seen that the memory empty status can be detected when the read and write address ring counters 32 and 36 point to the same memory register ($50_1$), and the last memory operation was a read operation.

It should be realized that with this method the particular memory addresses need not be maintained in a table, rather all that need be retained is information relating to whether the read and write addresses are equal (whatever they might be), and whether the last memory command processed was a read or write operation.

Figure 4:
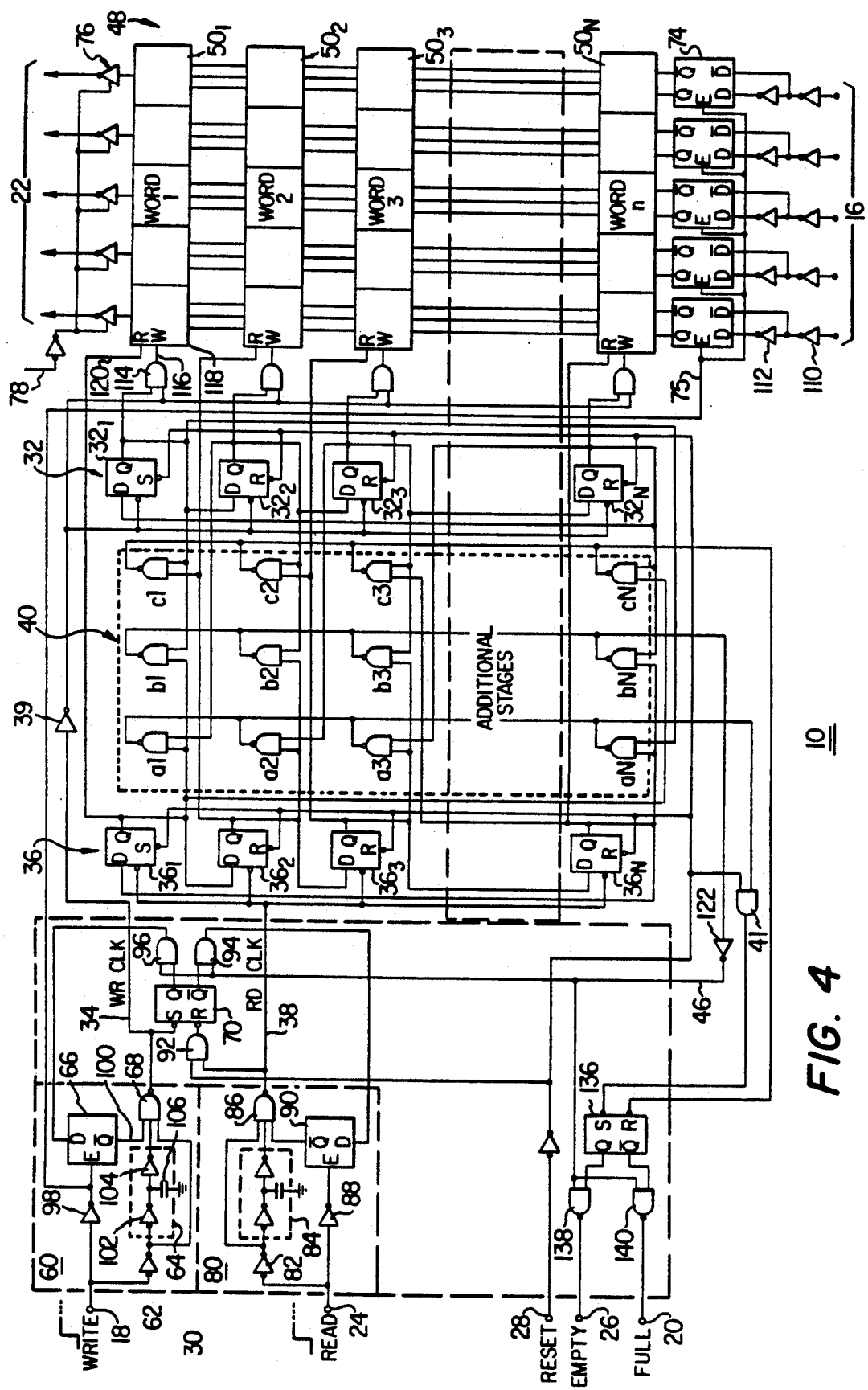
FIG. 4 is a detailed schematic diagram of the preferred embodiment of the FIFO memory buffer.

Referring again to FIG. 2, the memory word register $50_1$ has a data input 56 connected in common with the data-in bus 16. Each of the remaining word registers $50_{2-N}$ includes similar connections to bus 16. In a similar manner, each memory word register $50_{1-N}$ has a data output 58 connected in common with the data-out bus 22. Each data-in and data-out bus 16 and 22 is comprised of five bit lines corresponding to the number of data bits in a memory word (FIG. 4). In the exemplary FIFO memory buffer 10 described herein, there are N memory words for storing N number of data words, each exemplary word being five bits in length. Of course, the data words of the FIFO memory buffer 10 may be easily expanded to accommodate other popular eight, sixteen or thirty-two bit lengths.

As noted above, the write address ring counter 32 includes a number of stages, each of which is connected to the output of inverter 39. Each stage is associated with a memory word register 50 and is operative to direct a write signal to such memory register. To be described in detail below, the memory 48 is read or written starting with word 1, progressing through word N, and then repeating the same sequence again.

The read address ring counter 36 is provided with similar stages for sequentially reading each of the N memory registers 50 in a similar manner. Each stage of the read address ring counter 36 is connected to the read signal line 38.

Utilizing this technique of maintaining an account of the last memory read and write operation, and comparing of the read and write memory addresses for equality, a highly accurate determination can be made as to the full or empty status of the memory 48.

In accordance with an important feature of the invention, and departing from conventional practice, the cyclic operation of the FIFO memory buffer 10 relies only on the leading edge of the read and write input commands, irrespective of the timing of the trailing edge thereof. As noted above, this is highly advantageous as events which occur external to the FIFO memory buffer 10, such as changes in data on the data-in bus 16, or nearly simultaneous read or write operations when the memory 48 is empty or full, do not result in unreliable operation of the FIFO memory buffer 10. To that end, the W/R controller 30 includes circuitry for producing from the leading edge of the read or write commands, complete internal read and write pulses. Particularly, there is shown in FIG. 3 a simplified depiction of a write signal generator 60 of the W/R controller 30.

With this background, reference will now be made to FIGS. 3, 4 and 5 where the operation of the FIFO memory buffer 10 is shown in considerably more detail.

Figure 3:
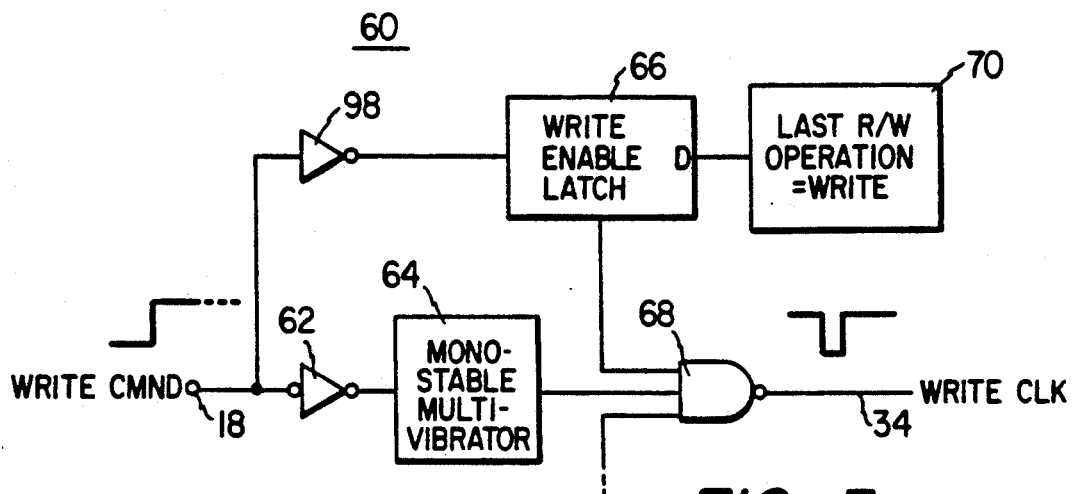
FIG. 3 is a simplified schematic illustration of a portion of the W/R controller employing a monostable multivibrator circuit for generating a write signal from a leading edge transition of an input write command.

In FIG. 3 there is shown at the input of the write signal generator 60, a waveform representing the leading edge of a write command, and at the output thereof the resulting write clock pulse denoted "WRITE CLK". A buffer gate 62 isolates the write command line 18 from the FIFO memory buffer 10 circuitry. A monostable multivibrator 64 receives at its input the same write command signal as on input 18, albeit with a gate delay. The monostable multivibrator 64 is of the type which is responsive to rising transitions for generating an output pulse. Internally or externally connected resistive and/or capacitive components (not shown) of the monostable multivibrator 64 are selected to produce an output pulse of a desired width. In the preferred embodiment of the invention, the monostable multivibrator 64 generates an output pulse of 30 nanoseconds width.

Of special significance also is the write enable latch 66 which is responsive to the leading edge of the write command, inverted by inverter 98, to inhibit the passing of a write clock pulse through NAND gate 68. It will be seen that this occurs only when the read and write address ring counters 36 and 32 point to the same memory words, and if the previous operation was also a write operation. A last W/R operation flip-flop 70 is provided to maintain an account of whether the last memory operation was a read operation of the memory 48, or a write operation. The last W/R operation flip-flop 70 is connected to the "D" input of the write enable latch 66 and provides the indication as to whether the monostable pulse should be passed through the NAND gate 68.

A read signal generator 80 of FIG. 4 is similarly responsive to the leading edge transition of read commands to produce read pulses on read line 38 when the memory 48 is not empty. Particularly, the monostable multivibrator 84 is connected to one input of a NAND gate 86. An inverter 88 inverts the read command signal and couples it to a read enable latch 90. The Q output of the read enable latch 90 is connected to an input of NAND gate 86.

In FIG. 4 there is shown a detailed electrical schematic representation of the FIFO memory buffer 10 according to the invention. In broad terms, the W/R controller 30 generates the write clock pulse signal on write line 34 and the read clock pulse on read signal line 38, in response to corresponding input commands, as long as the memory 34 is not full or empty. The read address ring counter 36 and a write address ring counter 32 each comprise a shift register with plural one-bit stages. The ring counters 32 and 36 shift a single logic high bit sequentially through the stages for pointing to the particular memory words to be read or written.

The comparator section 40 includes plural two-input NAND gates for determining the empty and full status of the memory 48. The NAND gates $40_b$ of the comparator section 40 compare the address outputs of the read address ring counter 36 with those of the write address ring counter 32, and collectively supply an output signal to the W/R controller 30 (on line 46) for use in making a determination of whether the memory 48 is full or empty. Particularly, NAND gate $40_{b1}$ compares the output of read address ring counter stage $36_1$ with that of write address ring counter stage $32_1$. NAND gate $40_{b2}$ compares stages $36_2$, and $32_2$, and so on. Thus, NAND gates $40_b$ compare read address ring counter stages 36 with equal order write address ring counter stages 32.

The memory 48 includes an input data latch, such as latch 74, wherein input data from the data-in bus 16 is latched on the trailing edge transition of a write command signal on line 75. The data-out bus 22 comprises the output of a number of tri-state drivers 76 supplying the power for driving the data-out bus 22 directed to the destination equipment. The high impedance state control 78 for the tri-state drives 76 is an auxiliary line also directed to the destination equipment.

The FIFO memory buffer of FIG. 4 will now be described in greater detail in connection with a typical operating cycle.

A negative pulse on reset input 28 is provided for initializing various circuits within the FIFO memory buffer 10 to a desired state. Particularly, the reset 28 resets the last R/W operation flip-flop 70 so that its $\overline{Q}$ output is at a logic high level. The reset 28 is also connected to the reset input "R" of stages $36_{2-N}$ and $32_{2-N}$ of the read and write address ring counters, and to the set input "S" of stages $36_1$ and $32_1$. Each address output of ring counter stages $36_{2-N}$ and $32_{2-N}$ is thus reset to a logic low, while ring counter stages $36_1$ and $32_1$ are set to output logic high levels. The reset signal is also coupled to AND gate 41 and initially sets flip-flop 136.

A reset signal is generally instituted during or subsequent to a power up of the FIFO memory buffer 10, whereby it should be assumed that no reliable data resides within the memory 48. Thus, an initial read of the memory should be prohibited, at least until a write operation has been executed so that there is reliable data in the first memory word $50_1$. Assuming that an initial read command has indeed been issued to an empty FIFO memory buffer 10 and that the read signal generator 80 has generated a read signal at the input of NAND gate 86, it will be seen that a resulting read clock pulse does not appear on read line 38.

Since the reset 28 has caused a logic high to appear on the $\overline{Q}$ output of the last R/W operation flip-flop 70, and assuming for a moment that the output of inverter 122 is high, AND gate 94 has logic highs on its inputs, and thus a logic high at its output. Read enable latch 90 is a D-type transparent latch of the type where the complement of the logic level appearing on its D input is transferred to the $\overline{Q}$ output, so long as the enable input E is at a logic high. When the enable input E is taken low the output will be latched at the logic level of the data that was set up at the low-going transition. Transparent latches of the SN74LS364 type manufactured by Texas Instruments Incorporated are exemplary of a latch which performs this operation.

Therefore, on the high-going leading edge transition of the input read command, the corresponding low-going transition on the output of inverter 88 will latch the complement of the logic high on the D input of transparent latch 90 as a logic low on its $\overline{Q}$ output. The logic low on such $\overline{Q}$ output is coupled to an input of the NAND gate 86.

Thus, because the read enable latch 90 has forced one input of NAND gate 86 low, such gate is inhibited from transferring any read signal generated by the monostable 84 in response to the initial read command.

However, since the Q output of the last R/W operation flip-flop 70 has been initially set to a logic low level, AND gate 96 output will present a logic low level to the write enable latch 66. A write command inverter 98 inverts the rising edge of a write command into a negative-going edge and applies it to the E input of the write enable latch 66. This causes the logic low on the D input thereof to be presented as a logic high on the $\overline{Q}$ output to input 100 of NAND gate 68. The third input of NAND gate 68 is also a high as a result of the logic high on the input and output of buffer 62. Therefore, a monostable multivibrator generated write pulse will be allowed to pass through NAND gate 68.

While the write monostable multivibrator 64 is shown in block form in FIG. 3, in actual practice, it is comprised of a buffer gate 102, an inverter 104 and a timing capacitor 106. It can be seen that the positive-going pulse of a write command is presented as such by buffer gate 62 to one input of NAND gate 68. The buffered write command is also applied to the input of another buffer 102. The timing capacitor 106 prevents the input of inverter 104 from following the input of buffer gate 102, as it delays the rising edge transition until the input threshold of inverter 104 is reached, whereupon, the output of inverter 104 goes to a logic low level thereby returning the output of NAND gate 68 to a logic high. Therefore, with the foregoing circuit arrangement, the rising edge transition of the write command results in a write clock pulse on write clock line 34.

Figure 5:
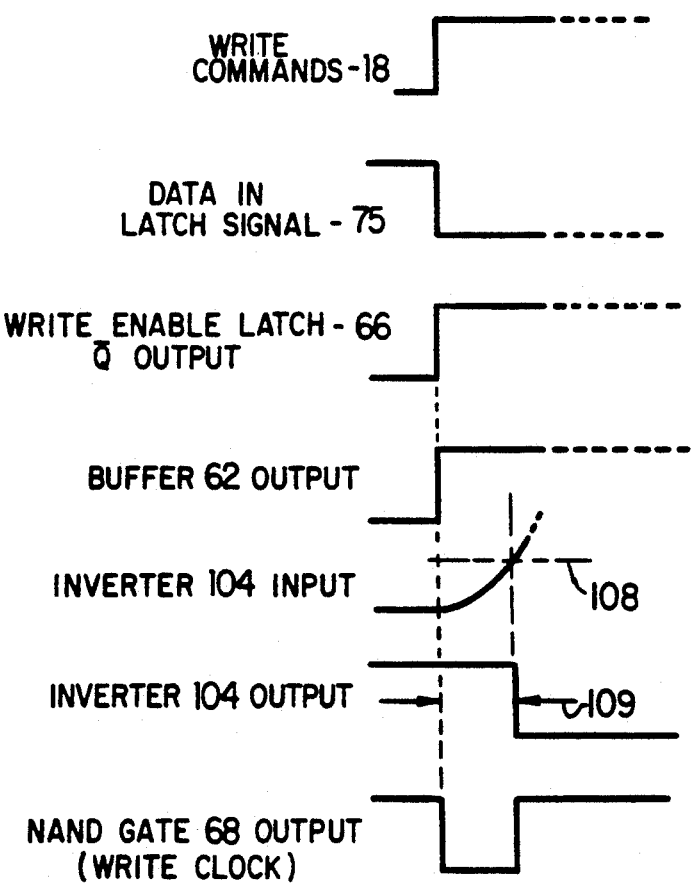
FIG. 5 is a waveform diagram of the monostable multivibrator circuit of the W/R controller.

With brief reference to FIG. 5 there is illustrated the waveforms within the W/R controller 30 which produce the write clock pulse on line 34. From the waveforms, it can be seen that as a result of the leading edge transition of the write command the output of inverter 98 goes low and, on line 75, sets the $\overline{Q}$ output of the write enable latch 66 to a logic high. Concurrently, the output of buffer gate 62 goes to a logic high level, whereby two logic highs appear on two of the NAND gate 68 inputs. Because the timing capacitor 106 at the input of inverter 104 maintains the output of such inverter at a delayed logic high, the third input of NAND gate 68 is also high, thereby generating the low-going portion of WRITE CLK. When the timing capacitor 106 charges to a voltage 108 corresponding to the input threshold of invertor 104, the inverter output will go low, as noted in the waveforms, and cause the output of NAND gate 68 to go high thereby completing the write clock pulse. Waveform dimension 109 of FIG. 5 represents the amount of time in which it takes the timing capacitor 106 to charge up sufficiently to present a logic high to the input of inverter 104 and cause the output thereof to go to a logic low level. A larger value timing capacitor 106 will result in a larger width write clock pulse on write line 34.

From the foregoing, it can be seen that the W/R controller 30 is responsive to the leading edge of the write command to produce the write clock pulse WRITE CLK. The read signal generator 80 of the W/R controller 30 is similarly constructed and is also responsive to a read command for producing the READ CLK pulse on read line 38.

Also in response to write commands, the output of inverter 98 is a low-going transition on line 75 which sets the digital data then existing on the data-in bus 16 into the respective transparent data input latches 74. Buffer inverters 110 receive the five data bits of each data word transmitted on the data-in bus 16 and convert the transmission line voltages into digital signals compatible with the circuit voltages of the FIFO memory buffer 10. The outputs of the buffer inverters 110, along with that of inverters 112 present each data bit, and its complement, to the respective input data latches 74. With this circuit arrangement, the digital data then existing on the data-in bus 16 is latched at the beginning of a write cycle into the input data latches 74. This is advantageous as any change in the digital data on the data-in bus 16 occurring immediately before or subsequent to the leading edge transition of the write command is ignored.

The write clock pulse (WR CLK) on line 34 is inverted by inverter 39 and simultaneously clocks each register stage of the write address ring counter 32. The outputs of each write address ring counter $32_1$—$32_N$ are connected to the D inputs of the adjacent higher order stage, except for the output of stage $32_N$ which is connected back to the D input of the first stage $32_1$. Therefore, on the low-going transition of $\overline{WR\ CLK}$ the logic high on the output of stage $32_1$ (from the reset) will be shifted through to the output of stage $32_2$. The output of write address ring counter stage $32_1$ appears as an input of AND gate 114, as does $\overline{WR\ CLK}$. Therefore, the output of AND gate 114 is a logic high pulse which is presented to memory word register $50_1$ on memory write signal line 116. The negative going transition of the positive pulse on line 116 effects the writing of the five data bits latched within the input data latch 74 into the corresponding cells or bit positions of the memory word $50_1$.

Each bit storage area 118 of memory word $50_1$ is a cross-coupled latch of the type wherein a logic low level at the respective read and write input thereof effects a corresponding read or write of all bits within the memory word register $50_1$. The cross-coupled latches forming each bit cell 118 of the memory word registers $50_1$–$50_N$ are of conventional design.

As noted above, the reset 28 initializes the read and write address ring counters 36 and 32 by setting the Q outputs of register stages $36_1$ and $32_1$ to logic high states, and by resetting the other register stages so that the output stages thereof are logic lows. The bit cells of each memory word register 50 are constructed such that a read operation is executed when the memory read signal line 120 is at a logic high stage. Conversely, and as noted above, the writing of a memory word is accomplished on the falling edge of the signal on the write line 116.

In keeping with the invention, the memory 48 can be considered empty or having unreliable data after having been reset by the reset 28. Accordingly, a subsequent read, without an intervening write operation, should be prohibited as the reading of an empty memory results in invalid data. A comparator NAND gate $40_{b1}$ has inputs connected to the outputs of read and write address ring counter register stages $36_1$ and $32_1$, and thus after initialization the output of NAND gate $40_{b1}$ is at a logic low. This logic low is coupled to the input of inverter 122, which in turn couples a logic high to the input of AND gates 94 and 96 of the last R/W operation flip-flop 70. As described above, this prevents an initial read command from being processed.

As concerns initial write operations, it should be noted that during the reset 28, the Q output of last R/W operation flip-flop 70 was set to a logic low, which logic low is coupled through AND gate 96 and appears at the D input of write enable latch 66. On the negative transition of the E input to such latch 66, the logic low at the D input appears as a logic high on the $\overline{Q}$ output thereby enabling an initial write command to be processed through the write signal generator 60. The write clock pulse generated appears on line 34 and thus set the Q output of the R/W operation flip-flop to a logic high, as well as clocks the write address ring counter 32. Because the Q output of each write address ring counter stage is connected to the D input of the adjacent higher order stage, as noted above, the logic high which was initially set into the write address ring counter $32_1$ shifts through each register stage position on successive WR CLK pulses on line 34. Therefore, on the occurrence of the first write command, memory word location $50_1$ is first written and then the logic high which was initially on the Q output of write address ring counter stage $32_1$ is shifted to the Q output of counter stage $32_2$.

Subsequent write and read operations, in that order, are permitted as each comparator NAND gate $40_{b1}$–$40_{bN}$ will have one input thereof at a logic low thereby presenting a logic high level to inverter 122. The output of inverter 122, in turn, applies a logic low on line 46 to AND gates 94 and 96, and thus a low to the D inputs of write and read enable latches 66 and 90. As a result, the $\overline{Q}$ outputs of both such latches 66 and 90 are logic highs thereby allowing further write and read operations.

Indeed, subsequent write and read operations can occur, and can even be executed simultaneously as long as the write address ring counter 32 advances ahead of the read address ring counter 36. Simultaneous read and write commands can be processed by the FIFO memory buffer 10 as the write circuitry is entirely independent of the read circuitry, provided the same memory word register is not pointed to by the read and write address ring counters 36 and 32. When, however, such condition exists, the last R/W operation flip-flop 70 dominates over the AND gates 94 and 96, wherein the independentness of the read and write operations is changed. This is seen as when the same memory word register is addressed by the read and write address counters 36 and 32, the output of inverter 122 is high, whereby the low on the $\overline{Q}$ or Q output of the last R/W operation flip-flop 70 will dictate whether the read signal generator 80 or the write signal generator 60 will be enabled through respective transparent latches 90 or 66.

It can be seen therefore that the last R/W operation flip-flop 70, which accounts for the last operation of a read or write command, together with the comparator 40, which detects when the read and write address ring counters 36 and 32 point to the same memory word, assures that memory words will not be read when the memory is empty and will not be written when full. Also operating in conjunction with the last R/W operation flip-flop 70 are the read and write signal generators 80 and 60 which provide a positive lockout of read and write commands in the event the processing of such commands would have resulted in the reading of an empty memory or the writing of a full memory.

The empty or full status of the memory 48, as detected by the comparator section 40, is signaled to other equipment by outputs 26 (EMPTY) and 20 (FULL). The circuit for signaling the empty/full status of the memory 48 is connected as follows.

NAND gate $40_{a1}$ compares read address ring counter stage $36_1$ with the higher order write address ring counter stage $32_2$. NAND gate $40_{a2}$ compares read counter stage $36_2$ with higher order write stage $32_3$, and so on. With this scheme, NAND gate $40_a$ compare read address ring counter stage 36 with respective higher order write address ring counter stages.

NAND gate $40_{c1}$ compares the output of write address ring counter stage $32_1$ with the output of higher order read address ring counter stage $36_2$. NAND gate $40_{c2}$ compares write stage $32_2$ with higher order read stage $36_2$, and so on. Thus, NAND gates $40_c$ compare write address ring counters 32 with respective higher order read address ring counter stages 36.

The output of each NAND gate $40_a$ is connected in common and to an AND gate 41. The other input of AND gate 41 is connected to the RESET signal of line 28. The output of AND gate 41 is connected to the set input of a flip-flop 136. Similarly, the output of each NAND gate $40_c$ is connected in common and to the reset input of flip-flop 136.

The output of inverter 122 is connected to an input of NAND gates 138 and 140. The Q and $\overline{Q}$ outputs of flip-flop 136 are connected respectively to another input of NAND gates 138 and 140. Finally, the output 26 of NAND gate 138 signals the EMPTY status of the memory 48, and the output 20 of NAND gate 140 signals the FULL status.

In operation, when NAND gates $40_a$ and $40_c$ of the comparator section 40 respectively detect the nearly empty or nearly full status of the memory 48, flip-flop 136 is correspondingly reset or set. By this it is meant that when only one memory word location remains available to be written into, NAND gates $40_c$ are operative to reset flip-flip 136. Conversely, when only one memory word location remains available to be read, NAND gates $40_a$ become operative to set flip-flop 136. Furthermore, when the noted last memory word location has indeed been written or read, NAND gates $40_b$ are operative to enable NAND gates 138 and 140. The enabling of NAND gates 138 and 140 permit flip-flop 136 outputs to pass a full or empty indication to external apparatus via the FULL line 20, or EMPTY line 26.

As an example of the foregoing, assume the output of read address ring counter stage $36_2$ is a logic one, and thus points to memory word location $50_2$; and that the write address ring counter stage $32_3$ similarly points to memory word location $50_3$. This is representative of a condition in which memory word $50_2$ is the last memory word written, and the next to be read, i.e., an almost empty condition. Thus, the inputs of NAND gate $40_{a2}$ will both be high, the output thereof will couple a low to AND gate 41 which, in turn, will set flip-flop 136. As a result, when, and if, memory word location $50_3$ is read, NAND gate $40_{b3}$ will find equality between stages $36_3$ and $32_3$, and thereby enable gate 138 to signal an EMPTY condition on output 26.

With regard to an example of a memory full condition, assume the output of write address ring counter stage $32_2$ is a logic one, and thus points to memory word location $50_2$; and that the read address counter stage $36_3$ similarly points to memory word location $50_3$. This is representative of a condition in which memory word $50_2$ is the last memory word read, and the next to be written, i.e., an almost full condition. Thus, the inputs of NAND gate $40_{c2}$ will both be high, and the output thereof will couple a low to the reset input of flip-flop 136. Such flip-flop will accordingly be reset and place a logic high on one input of gate 140 in anticipation of a full condition. Indeed, if another write operation occurs and the read and write stages $36_3$ and $32_3$ point to memory word location $50_3$, NAND gate $40_{b3}$ will enable gate 140, whereupon a logic low will signal a FULL condition on output 20.

From the foregoing, a zero fall-through time asynchronous FIFO buffer memory, with nonambiguous empty or full status, has been provided. A comparator detects when a memory word is subject to being written or read, while a last R/W operation flip-flop maintains an account of whether the last memory operation was a read operation or a write operation. A read signal generator and a write signal generator are responsive to the leading edge transition of respective input read commands and write commands to generate internal read and write pulses. The read signal generator is also responsive to the comparator section and the last R/W operation flip-flop to prevent the internal generation of a read signal if the read and write address ring counters point to the same memory word, and also if the last operation was a memory read operation. Similarly, the write signal generator, in conjunction with the comparator section and last R/W operation flip-flop, prevents the generation of a write signal if the counters point to the same memory word and if the last operation was a write operation.

While the preferred embodiment of the method and apparatus have been disclosed with reference to specific logic structures, it is to be understood that many changes in detail may be made as a matter of engineering choices without departing from the scope of the invention as defined by the appended claims. Also, it is not necessary to adopt all of the various advantageous features of the present disclosure into a single composite FIFO memory buffer in order to realize the individual advantages. Accordingly, such features are individually defined in some of the claims which follow.

What is claimed is:

1. A method of determining the status of a shift register memory performing read and write operations, comprising the steps of:
    (a) maintaining an account of the last memory read and write operation;
    (b) comparing the current shift register address of the memory write operation with a current address of a memory read operation; and
    (c) providing an indication of the status of the memory upon the equality of the current address of a memory read operation with respect to the current address of memory write operation, wherein:
        i. the status of said memory is determined as being full when the last memory operation was a write operation and
        ii. the status of said memory is determined as being empty when said last memory operation was a read operation.

2. The method of claim 1 further including the step of initiating a memory operation on a transitional edge of an electrical pulse directed to said memory by other equipment, and completing said memory operation as a result of said transitional edge irrespective of any other transitional edge of said electrical pulse.

3. The method of claim 2 further including the step of generating a second electrical pulse within said memory system for reading said memory as a result of said transitional edge.

4. The method of claim 3 further including the step of generating a third electrical pulse within said memory system for writing said memory as a result of said transitional edge.

5. The method of claim 3 further including the step of inhibiting the generation of the second electrical pulse for reading the memory when said indication indicates the memory is empty.

6. The method of claim 4 further including inhibiting the generation of the third electrical pulse for writing the memory when said indication indicates the memory is full.

7. In a shift register memory system, a circuit for determining the status thereof, comprising:
(a) means for maintaining an account of the last memory read and write operations in said memory system;
(b) means for comparing the current address of a memory write operation with the current address of a memory read operation; and
(c) means for providing an indication of the status of said memory system upon the equality of the current address of a memory read operation with respect to the current address of a memory write operation wherein:
  i. the status of said memory is determined as being full when the last memory operation was a write operation, and
  ii. the status of said memory is determined as being empty when said last memory operation was a read operation.

8. The circuit of claim 7 further including:
means for initiating a memory operation on a transitional edge of one of a plurality of input electrical pulses directed to said memory by other equipment; and
means for completing said memory operation as a result of said transitional edge irrespective of other transitional edges of said plurality of input electrical pulses.

9. The circuit of claim 8 further including means responsive to said transitional edge for generating a second electrical pulse for reading said memory.

10. The circuit of claim 8 further including means responsive to said transitional edge for generating a second electrical pulse for writing said memory.

11. The circuit of claim 9 further including means for inhibiting the generation of the second electrical pulse for reading said memory when said memory is empty.

12. The circuit of claim 10 further including means for inhibiting the generation of the second electrical pulse for writing said memory when said memory is full.

13. In a memory of the type having a plurality of interconnected addressable memory registers responsive to memory operations for writing data therein and reading data therefrom, a read and write controller, comprising:

write address means for sequentially addressing each said memory register for writing data therein;
read address means for sequentially addressing each said memory register for reading data therefrom;
comparator means for comparing an address of said write address means with an address of said read address means to determine equality of said addresses;
read and write storage means for storing an indication of the most recent of a read or write operation of said memory; and
means for preventing a memory operation of said memory when said comparator determines equality of said read and write addresses and when said read and write storage means has stored therein an indication that the last memory operation was a predetermined operation of said memory.

14. The memory of claim 13 wherein said write address means further includes:
a write address counter;
a data input latch for storing input data to be written into one said memory register associated with said write address; and
circuit means responsive to the first transition of a write command from an external source for incrementing said write address counter, for latching input data into said latches, and for storing the latched input data in said memory register.

15. The memory of claim 14 wherein said circuit means further includes pulse generation means responsive to said transition for generating a write pulse for writing said latches input data into said memory registers.

16. The memory of claim 15 wherein said pulse generation means generates a pulse of predetermined width.

17. The memory of claim 13 wherein said read address means further includes:
a read address counter; and
circuit means responsive to the first transition of a read command from an external source for incrementing said read address counter, and reading data from one said memory register.

18. The memory of claim 14 wherein said circuit means further includes pulse generation means responsive to said transition for generating a read pulse for reading data from said memory register.

19. The memory of claim 15 wherein said pulse generation means generates a pulse of a predetermined width.

20. A shift register system, comprising:
a memory having a plurality of storage elements each adapted for writing data therein and reading data therefrom;
a write address ring counter having a plurality of one-bit stages each with an output connected to a different said storage element for effecting a memory write operation thereof, each said stage further including an input connected to the output of an adjacent stage, and a clock input whereby when clocked the contents of each said stage is transferred to the adjacent stage connected therewith;
a read address ring counter having a plurality of one-bit stages each with an output connected to a different said storage element for effecting a memory read operation thereof, each said stage further including an input connected to the output of an adjacent stage, and a clock input whereby when clocked the contents of each said stage are transferred to the adjacent stage connected therewith;

means for initializing said write address ring counter and said read address counter so that a logic signal of one level is stored in only one stage of each said counter, and so that a logic signal of another level is stored in the remaining stages of each said counter;

a comparator comprising a plurality of logic gates, each said gate having an input connected to the output of one said write address ring counter stage and an input connected to the output of one said read address ring counter shape, the outputs of said logic gates providing an indication of when a storage element of said memory is connected to a write and read address ring counter stage with the outputs thereof having said one logic signal level;

a write signal generator responsive to the leading edge transition of an input write command for producing a write pulse to effect a write operation of said memory;

a read signal generator responsive to the leading edge transition of an input read command for producing a read pulse to effect a read operation of said memory;

a last read/write operation circuit with an input responsive to said write pulse and an input responsive to said read pulse, and an output for indicating the last read or write operation processed by said shift register system;

a write enable latch responsive to said indication on the outputs of said comparator logic gates, and responsive to an output of said last read/write operation circuit indicating a write operation last processed, for inhibiting a write operation of said memory by said write pulse; and a read enable latch responsive to said indication on the outputs of said comparator logic gates, and responsive to an output of said last read/write operation circuit indicating a read operation last processed, for inhibiting a read operation of said memory by said read pulse.

21. The shift register system of claim 20 further including means responsive to the outputs of said comparator logic gates for signaling an almost full and an almost empty status of said memory.

22. The shift register system of claim 20 further including means for indicating a full memory condition and an empty memory condition in response respectively to the signaling of said almost full and almost empty statuses.

* * * * *